United States Patent
Hilliard, Jr. et al.

(10) Patent No.: US 11,474,189 B1
(45) Date of Patent: Oct. 18, 2022

(54) CLUSTER TRACK IDENTIFICATION

(71) Applicant: BAE SYSTEMS Information and Electronic Systems Integration Inc., Nashua, NH (US)

(72) Inventors: John E. Hilliard, Jr., Nashua, NH (US); Philip J. Haney, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 277 days.

(21) Appl. No.: 16/719,375

(22) Filed: Dec. 18, 2019

(51) Int. Cl.
*G01S 5/02* (2010.01)
*G01C 21/16* (2006.01)

(52) U.S. Cl.
CPC .......... *G01S 5/0215* (2013.01); *G01C 21/165* (2013.01); *G01S 5/0236* (2013.01)

(58) Field of Classification Search
CPC .... G01S 5/0215; G01S 5/0236; G01C 21/165
USPC ........................ 342/195, 442, 418
See application file for complete search history.

(56) References Cited

U.S. PATENT DOCUMENTS

| | | | | |
|---|---|---|---|---|
| 5,526,001 | A * | 6/1996 | Rose | G01S 1/026 342/442 |
| 7,436,359 | B1 * | 10/2008 | Rose | G01S 5/12 342/442 |
| 2002/0033769 | A1 * | 3/2002 | Bass | G01S 5/12 342/418 |

* cited by examiner

*Primary Examiner* — Bo Fan
(74) *Attorney, Agent, or Firm* — Maine Cernota & Rardin; Scott J. Asmus

(57) ABSTRACT

A correlation and track system identifies whether a Radar warning (RW) Track contains one or more emitters by receiving a set of initial Short and Long Baseline Interferometer (SBI) (LBI) detections; receiving inertial navigational data; receiving subsequent LBI detections; determining whether the LBI detections represent one or multiple emitter(s) by designating an initial SBI conic with a multiple of its one sigma conic Direction Finding (DF) accuracy window as containing the emitter; laying down a set of grid points within the SBI conic window as possible emitters' locations; summing real and imaginary values of a residual phase in the form of a unit vector at each grid point for each LBI update; identifying whether there are one or more emitters in RW track based on whether the magnitude of a peak vector is above or below a defined threshold; and invoking geolocation algorithms based on the vector's magnitude.

17 Claims, 8 Drawing Sheets

EXAMPLE OF ONE EMITTER FOR A SINGLE FREQUENCY

200

300

PLOT A

PLOT B

EXAMPLE OF ONE EMITTER FOR A SINGLE FREQUENCY

500

PLOT A

PLOT B

EXAMPLE OF ONE EMITTER AND FREQUENCY AGILITY

PLOT A

PLOT B

EXAMPLE OF TWO EMITTERS FOR A SINGLE FREQUENCY

EXAMPLE OF TWO EMITTERS AND FREQUENCY AGILITY

CLUSTER TRACK IDENTIFICATION

STATEMENT OF GOVERNMENT INTEREST

This invention was made with government support under Contract No. N00019-19-C-0010 and Subcontract Number 6500005205 awarded by NAVAIR. The United States Government has certain rights in the inventions.

FIELD

The following disclosure relates to a new algorithm called Cluster Track Identification (CTI) used to determine whether a Radar Warning (RW) track is comprised of a single or multiple emitter(s). The outcome of which is used to control how to invoke geolocation algorithms.

BACKGROUND

Correlation and Track (CAT), a Computer Software Configuration Item (CSCI), often correlates multiple emitters with same emitter characteristics and similar angle-of-arrival (AoA) into the same RW track while operating in dense Radio Frequency (RF) environments. This in turn causes problems with the convergence and location predictions generated by the geolocation algorithms because Long Base Interferometer (LBI) pulses transmitting from multiple emitters are being measured, combined, and sent to the same request message to the geolocation algorithm.

A LBI delta phase measurement is the combination of the theoretical delta phase between a pair of LBI antennas and the residual phase produced by the overall receiver system behind the LBI antennas as shown in equation 1.

$$LBI_{MeasPhase} = LBI_{TheoPhase} + \text{Residual } LBI_{CompensationPhaseError} \quad \text{(Eq. 1)}$$

The residual LBI phase error is comprised of several error sources. These include LBI antenna mounting errors, LBI antenna separation errors, signal-to-noise (SNR), vibration, wing flexure, Inertial Navigation System (INS) errors, and the RF cable length differences between the LBI antennas and receiver.

Geolocation accuracy is impacted by these unknown electrical path length differences behind the LBI antenna, especially when trying to do geolocation on a frequency agile emitter. This is because the delta phase for the unknown electrical path length difference changes as a function of frequency. Geolocation results are further impacted by LBI pulses generated from multiple emitters correlating into the same RW track.

What is needed is a method to identify the condition when multiple emitters with similar identification (ID) and angle-of-arrival have been grouped together in the same RW track while operating in dense RF environments.

SUMMARY

An embodiment provides a system to identify at least one emitter for invoking a geolocation method for locating the at least one emitter comprising receiving, at a sensor array, an initial Short Base Interferometer (SBI) and Long Base Interferometer (LBI) set of detections; receiving, at the sensor array, subsequent LBI detections; receiving inertial navigational data on platform's location and orientation; determining, in a processor, whether the LBI detections represent one emitter or a plurality of emitters over time; and invoking the geolocation method based on the determined number of emitters. In embodiments, determining whether the LBI detections represent one emitter or a plurality of emitters comprises using a Direction Finding (DF) conic bearing and one sigma DF accuracy of a Short Baseline Interferometer (SBI) array. In other embodiments, determining whether the LBI detections represent one emitter or a plurality of emitters comprises using a Direction Finding (DF) conic bearing and one sigma DF accuracy of a Short Baseline Interferometer (SBI) array to laydown a grid on the Earth. In subsequent embodiments, determining whether the LBI detections represent one emitter or a plurality of emitters comprises updating, at each grid point as each new subsequent LBI detection is made. For additional embodiments, determining whether the LBI detections represent one emitter or a plurality of emitters comprises determining how a Correlation and Track (CAT) Computer Software Configuration Item (CSCI) will invoke the geolocation method as a single frequency emitter versus a frequency agile emitter. In another embodiment, the initial SBI and LBI detections and the subsequent LBI detections have similar angles-of-arrival (AoA). For a following embodiment the initial and LBI detections and the subsequent LBI detections are correlated in a same Radar Warning (RW) track. In subsequent embodiments the initial LBI detection and the subsequent LBI detections are in dense RF environments. In additional embodiments a Short Baseline Interferometer (SBI) conic of the LBI detections is designated as containing a LBI conic of the LBI detections within a window defined by a plus or minus multiple of its one sigma Direction Finding (DF) accuracy. In included embodiments a Short Baseline Interferometer (SBI) conic of the SBI detections is designated as containing a LBI conic of the LBI detections within a plus or minus multiple of 2.5 of its one sigma Azimuth Conic Direction Finding (DF) accuracy. Yet further embodiments comprise a laydown on Earth of azimuth conics 15 to 165 degrees in 5 degree increments. In related embodiments, determining whether the LBI detections represent one emitter or a plurality of emitters comprises an XY laydown in Local Level North-East-Down (LLNED) coordinates for a forward hemisphere of possible locations out to 200 Nmi. For further embodiments, determining whether the LBI detections represent one emitter or a plurality of emitters comprises summing a real and an imaginary value of a residual phase unit vector for each grid point at each LBI update; and averaging by a number of LBI updates; and determining a maximum averaged peak of a Peak Averaged Summation value pointing to a most likely location of the emitter. In ensuing embodiments the sensor array is aboard an aircraft.

Another embodiment provides a method for identifying at least one emitter for invoking a geolocation method for locating the at least one emitter comprising receiving an initial Short Base Interferometer (SBI) and Long Base Interferometer (LBI) set of detections; receiving subsequent LBI detections; determining whether the LBI detections represent one emitter or a plurality of emitters over time; and invoking the geolocation method based on one or more emitter(s). For yet further embodiments, determining whether the LBI detections represent one emitter or a plurality of emitters comprises using a Direction Finding (DF) conic bearing of a Short Baseline Interferometer (SBI) array to laydown a grid on the Earth. For more embodiments, determining whether the LBI detections represent one emitter or a plurality of emitters comprises Correlation and Track (CAT) Computer Software Configuration Item (CSCI) to invoke geolocation algorithms as a single frequency emitter versus a frequency agile emitter. Continued embodiments include a Short Baseline Interferometer (SBI) conic of the LBI detections is designated as containing a LBI conic of the LBI detections within a plus or minus multiple of its one sigma Direction Finding (DF) accuracy. For additional embodiments, determining whether the LBI detections represent one emitter or a plurality of emitters comprises summing a real and an imaginary value of a residual phase at each grid point for each LBI update; and averaging by a number of LBI updates, determining a maximum averaged peak of a Peak Averaged Summation vector magnitude pointing to a most likely location of the emitter.

A yet further embodiment provides a non-transitory computer readable medium having stored thereon software instructions that, when executed by a processor, cause the processor to generate control signals to identify at least one emitter for invoking a geolocation method for locating the at least one emitter by executing the steps comprising receiving, at a sensor array, an initial Short Base Interferometer (SBI) and Long Base Interferometer (LBI) set of detections; receiving, at the sensor array, subsequent LBI detections; receiving, inertial navigational data on a platform's location and orientation; determining, in a processor, whether the LBI detections represent one emitter or a plurality of emitters over time, the determining comprising designating a Short Baseline Interferometer (SBI) conic of the LBI detections as containing a LBI conic of the LBI detections with a plus or minus multiple of 2.5 of its one sigma Azimuth Conic Direction Finding (DF) accuracy; using a conic DF bearing of the SBI with a plus or minus multiple of 2.5 of its one sigma Azimuth Conic Direction Finding accuracy to laydown a set of grid points on the Earth for a forward hemisphere of possible locations out to 200 Nmi.; summing a real and an imaginary value of a residual phase in a form of a unit vector for each grid point of the grid at each LBI update; and averaging by a number of LBI updates; determining a maximum averaged peak of a Peak Averaged Summation value and compare against a Cluster Track Identification (CTI) threshold; identifying a track as most likely comprised of one or more emitters; and invoking the geolocation method based on the number of emitters determined in the track.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art viewing the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

The Cluster Track Identification (CTI) algorithm provides the ability to know when multiple emitters have been grouped together into the same RW Track, the outcome of which is used to determine how to invoke the geolocation algorithm.

By using a Direction Finding (DF) conic bearing produced by a linear SBI array to lay down a set of grid points onto the Earth, and updating the CTI algorithm at each grid point whenever a new LBI detection is made, the CTI algorithm recognizes whether a RW track has only one emitter contained within its track information versus two or more emitters over time. Knowing this information allows CAT CSCI to invoke the geolocation algorithm appropriately, creating a situation in which it is less likely LBI pulses will originate from more than one location, resulting in a good set of geolocation results over time.

Embodiments detect whether RW Tracks maintained by CAT CSCI contain a single, two, or more emitters. This is used to determine how CAT CSCI invokes the geolocation algorithm in order to improve geolocation results.

Embodiments of the CTI algorithm can be used to split RW tracks with multiple emitters, and predict and display on a display a location for each emitter.

Figure 1A:
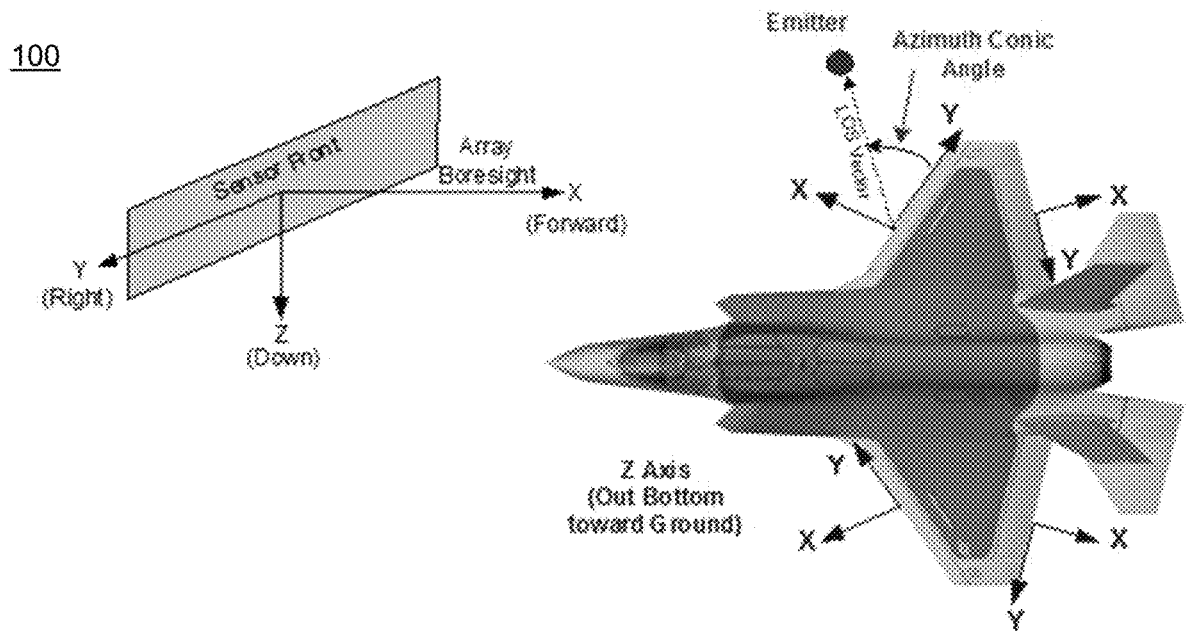
FIGS. 1A and 1B illustrate how Short Baseline Interferometer (SBI) and LBI conics are defined, and how SBI or LBI conics would look projected to the Earth for the entire forward hemisphere from a single SBI/LBI linear array in accordance with an embodiment.
Figure 1B:
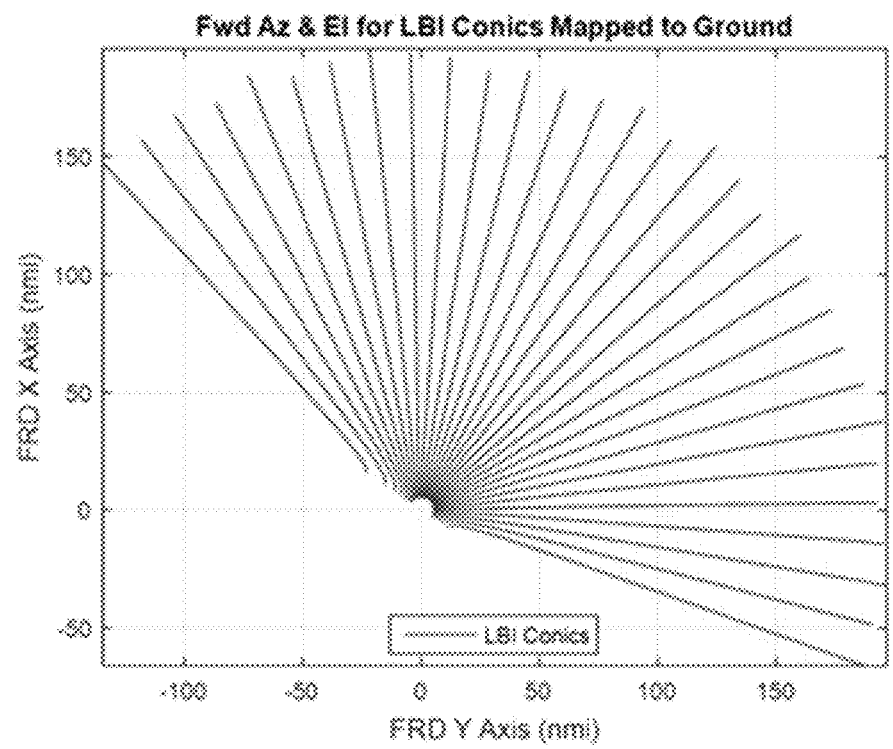

FIGS. 1A and 1B depict conic definition 100. FIG. 1A shows the XYZ rectangular definition for a linear SBI and LBI array orientation in array or sensor coordinates. FIG. 1A also shows the orientation of each set of array's XYZ rectangular coordinates as they would appear on an aircraft if a linear SBI and LBI array were installed in the leading and trailing edges of each wing of an aircraft. FIG. 1A also defines the SBI or LBI conic angle as the angle between a vector pointing towards the emitter and another vector pointing in the positive (Y) direction or baseline vector for that SBI and LBI array location. As shown in FIG. 1A, the typical aircraft has a number of sensors, and the SBI and LBI baseline vectors all point in a positive Y direction. It should be noted, a SBI array generally reports an unambiguous conic angle solution while a LBI array comprised of two antennas is highly ambiguous. Since the SBI and LBI arrays are nearly collinear, it can be assumed that the SBI conic with some plus or minus multiple of its one sigma DF accuracy should contain the highly accurate yet ambiguous LBI conic. Therefore, a SBI conic and its conic DF accuracy are used to determine the window of possible location(s) of emitter(s) producing LBI detections that are used to identify the one or more emitters present in RW track.

FIG. 1B shows a depiction of what the SBI or LBI conics would look like if projected onto the Earth in Local Level North-East-Down (LLNED) coordinates for a set of conic angles ranging from 15 to 165 degrees in 5 degree increments in the forward right quadrant. This is used to help develop how grid points should be laid down and selected. Based on the conic projection onto the Earth, a circular set of grid points versus a rectangular grid layout was chosen.

Figure 2A:
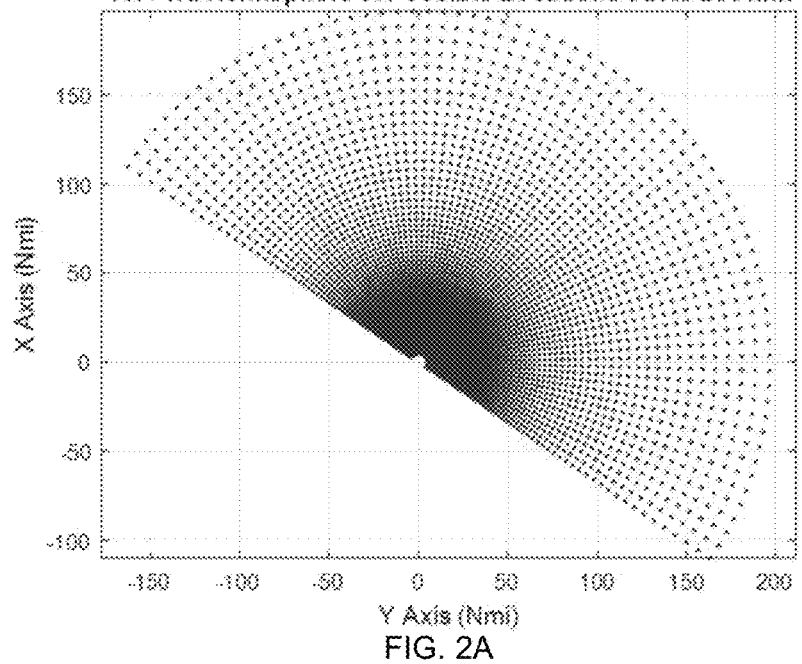
FIGS. 2A and 2B depict XY or North by East laydown of grid points configured in accordance with an embodiment.
Figure 2B:
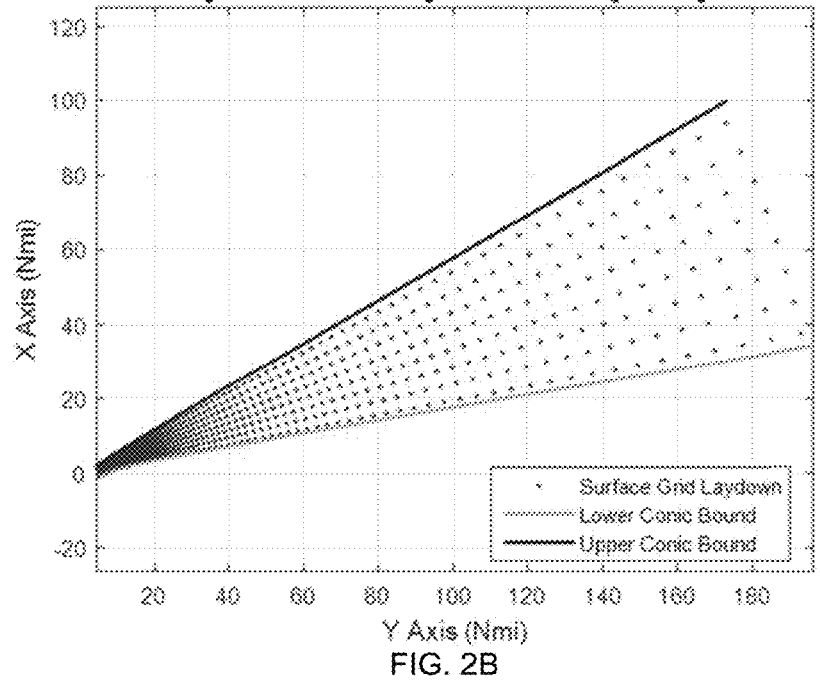

FIGS. 2A and 2B depict LLNED XY plane laydown 200. By laying out a grid of spatial points along and around a SBI conic projected onto the Earth using the initial SBI/LBI set of detections, one of the grid points should be, in theory, very close to the actual emitter's location. FIG. 2A shows a semicircular two lambda separated set of grid points laid down in forward right quadrant out to 200 Nmi from ownship or aircraft. FIG. 2B shows the subset of the circular grid points which are bounded by a +/−2.5 times the one sigma DF azimuth conic accuracy on both sides of a SBI conic bearing. The bounding is used as an example for illustrative purposes and to establish an upper bound and a lower bound to focus on a defined region of interest and should contain the emitter(s) producing the LBI pulses. Within the bounded region, the number of emitters and manner in which to invoke the geolocation algorithm can be determined by the processing techniques detailed herein. Specifically shown are XY laydown in LLNED coordinates for a forward right hemisphere of possible locations out to 200 Nmi., and the XY laydown in LLNED coordinates bounded by the lower and upper conic angles of 43.95 and 63.95 degrees for a SBI conic bearing of 53.95 degrees, representing the possible window of a single or multiple emitter(s) contained in the RW track.

Figures 3A, 3B:
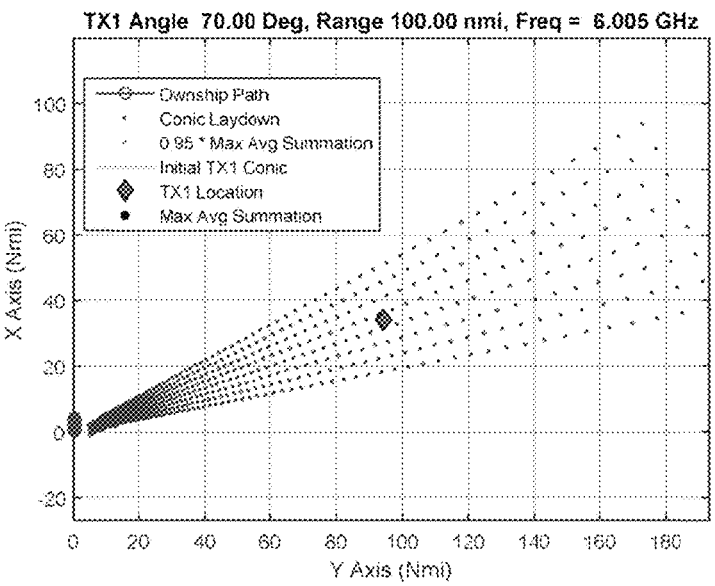
FIGS. 3A and 3B depict peak averaged summation vector magnitude determination configured in accordance with an embodiment.

FIGS. 3A and 3B depict peak averaged summation vector magnitude determination 300. Referring to FIG. 2B, as to how the grid points along and around the SBI conic were laid out and projected onto the Earth using the initial SBI and LBI set of detections, one of the grid points, in theory, should be very close to the actual emitter's location. As an example, if ownship or aircraft moves north over time as shown by line on left in FIG. 3A, a residual phase value is computed for each grid point using Equation 1 for each set of LBI delta phase measurements made over time. The residual phase error is treated as a unit vector and a unique summation of the real and imaginary parts of the unit vector are kept at each grid point for each LBI delta phase updated measured over time.

Emitter location is determined by the steps of summing the real and imaginary parts of a unit vector representing residual phase from each grid point after removing the theoretical delta phase that would have been created had the emitter been located there, and summing them at each grid point for each LBI delta phase measurement and dividing by the number of LBI updates or measurements. Then searching over all grid points for the maximum resultant vector length. A "Peak Averaged Summation" vector magnitude is created by this process that points to the most likely location of the emitter.

As an example, depicted in FIG. 3A is an emitter (TX1) located 70.00 degrees off the nose of the aircraft at a range of about 100.00 Nmi. from the aircraft for a frequency equal to 6.005 GHz. This emitter TX1 is bounded by the region of the SBI conic used to derive the grid points derived from the first set of SBI data and +/−2.5 times its one sigma DF accuracy. The receiver system located at coordinates (0, 0) receives a plurality of the SBI and LBI delta phase data over time as it moves north. The first set of SBI data is used to lay down the grid points which should encompass the actual emitter's location. Residual phase from each LBI data is converted to a real and imaginary unit vector and summed for each LBI measurement update and maintained in a data table for each grid point. It is then divided by the number of updates. Then a search is made for the maximum averaged peak. For a poor match, the resultant averaged summed vector has a smaller magnitude compared to the best match as shown in FIG. 3B.

Single frequency tracks do not need to correct for RF cable difference behind LBI antennas because the phase bias is constant over various spatial angles for a single frequency application. The phase bias is absorbed by a summation process, causing a rotation of residual phase error vectors on the unit circle. Frequency agility improves the prediction of emitter's location by adding another dimension to the optimization process due to varying wavelengths, but requires additional optimization step to correct for possible RF cable length differences behind the LBI antennas. By knowing a rough electrical path length difference and tolerance for each LBI antenna RF path back to the receiver, a different residual phase is computed at each grid point for each possible RF cable length. By searching over all the grid points and RF cable lengths combinations, the peak vector summation point is the most likely grid and RF cable length for the emitter transmitting the RF signal. In FIG. 3A the "Peak Averaged Summation" vector magnitude with no real world errors is applied to the measured LBI data, in other words Theoretical Results, falls on top of the diamond shape indicating where the emitter was located.

Increasing Traversed Bearing Spread (TBS) has been found to improve the accuracy of locating the closest grid point in the embodiments, the grid point associated with the "Peak Averaged Summation" vector magnitude with some additional optimization in the local area of the peak using a finer set of grid points can be used to determine a better emitter's location. The important take away is that the "Peak Averaged Summation" vector magnitude can be used as indicator as to whether the LBI pulses emanate from one or more emitters. It was observed that two identical emitters located in different regions of the Track/DF uncertainty window resulted in a "Peak Averaged Summation" vector magnitude significantly lower than those created by a single emitter condition. In embodiments, a peak vector magnitude greater than 0.92 has been shown to be a good indicator of only one emitter. In embodiments, a peak vector magnitude less than 0.92 has been shown to be a good indicator of two or more emitters. The "Peak Averaged Summation" vector magnitude can be used therefore to identify RW "Track Clustering".

FIGS. 4-7 present results of four different test conditions, each set of plots shows grid points, and predicted location of emitter(s) with their "Peak Averaged Summation" vector magnitude.

Figure 4:
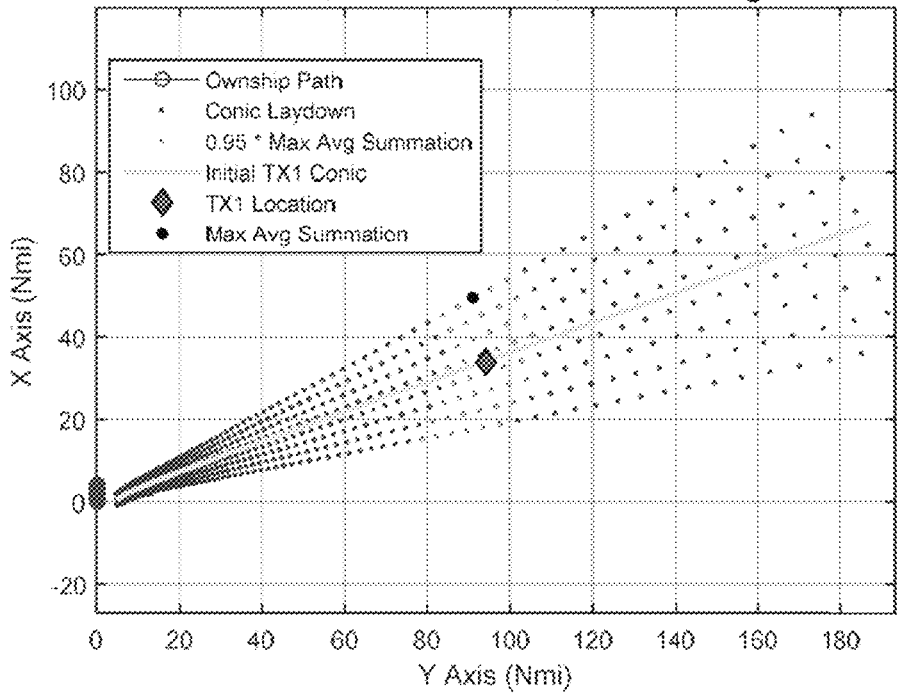
FIG. 4 depicts an example of one emitter transmitting a single frequency configured in accordance with an embodiment.
Figure 4:
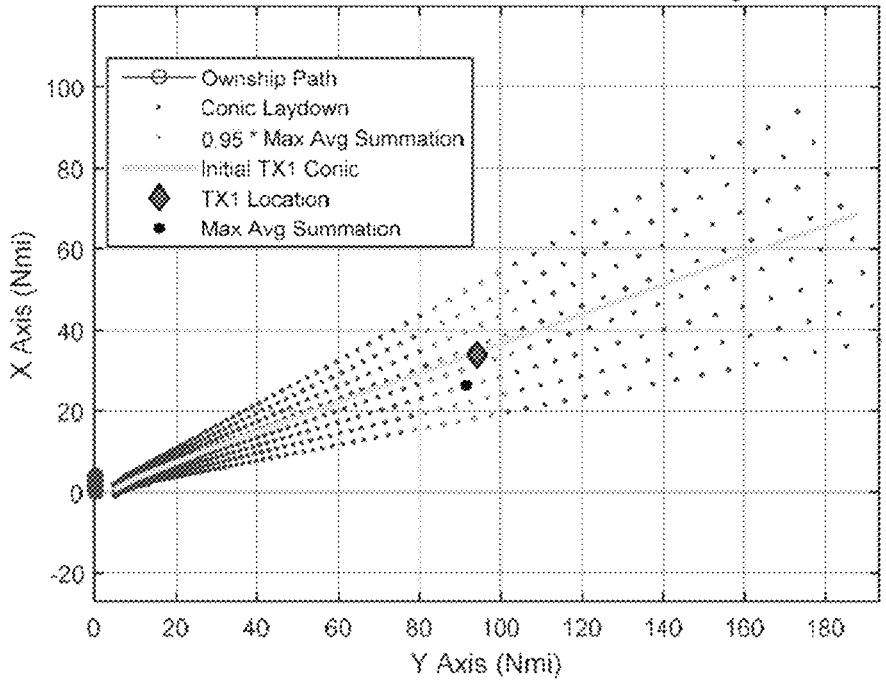

FIG. 4 depicts an example 400 of one emitter operating at a single frequency. The "Peak Averaged Summation" vector magnitude is very high. Frequency tested=6.005 GHz. (Plot A) No error terms applied to SBI or LBI delta phase measurements. At LBI delta phase update number 61, TX1 angle 70.00 deg. off nose of aircraft at a range of 100.00 Nmi., freq.=6.005 GHz, Horizontal Cross Range (CR) Percent Range Error (PRE)=15.63%, Down Range (DR) PRE=1.97%, TBS=2.27 deg. and "Peak Averaged Summation" vector magnitude=1.000. (Plot B) Applying error terms to each SBI or LBI delta phase measurement. At LBI delta phase update number 61, TX1 angle 70.00 deg., range 100.00 Nmi., freq.=6.005 GHz, horiz. CR PRE=6.93%, DR PRE=4.82%, TBS=2.27 deg. and "Peak Averaged Summation" vector magnitude=0.952. These examples show that with and without anticipated errors applied to SBI and LBI delta phase measurements, the "Peak Averaged Summation" vector magnitude stays above the 0.92 CTI threshold, indicating the RW track has only one emitter in its track.

Figure 5:
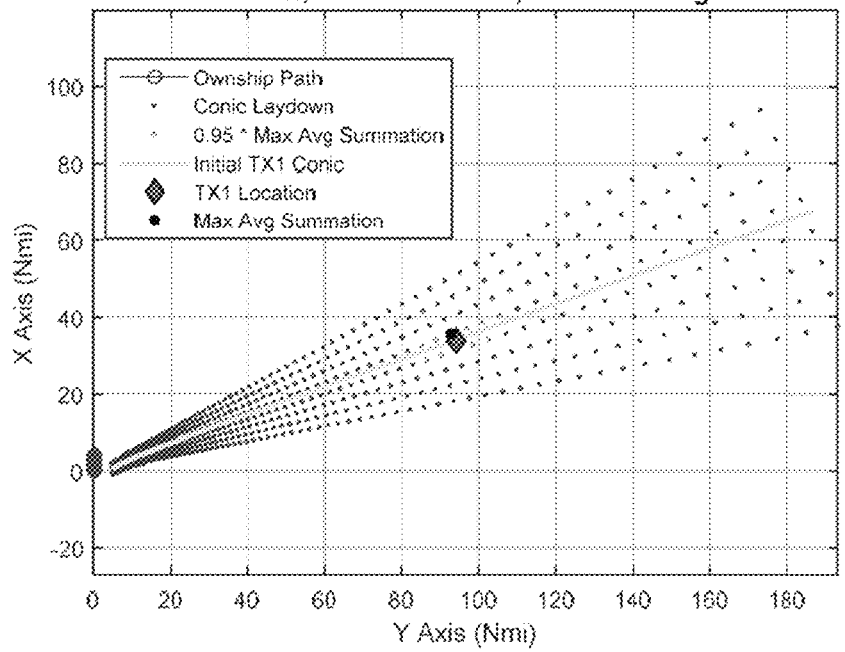
FIG. 5 depicts an example of one emitter transmitting several frequencies configured in accordance with an embodiment.
Figure 5:
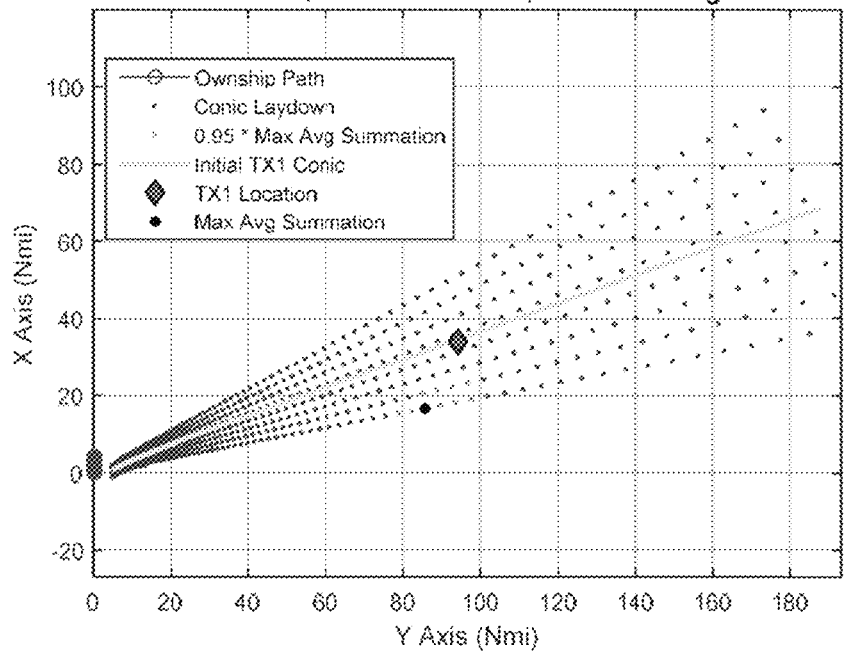

FIG. 5 depicts an example 500 of one emitter which is frequency agile operating at two frequencies. "Peak Averaged Summation" vector magnitude is very high even with frequency agility. Frequencies tested=6.005 & 6.305 GHz (only 6.005 GHz shown). (Plot A) No error terms applied to SBI or LBI delta phase measurements. At LBI delta phase update number 61, TX1 angle 70.00 deg., range 100.00 Nmi., freqs.=6.005 & 6.305 GHz, horiz. CR PRE=1.73%, DR PRE=0.73%, TBS=2.27 deg. and "Peak Averaged Summation" vector magnitude=0.994. (Plot B) Applying error terms to each SBI or LBI delta phase measurement. At LBI delta phase update number 61, TX1 angle 70.00 deg., range 100.00 Nmi., freqs.=6.005 & 6.305 GHz, horiz. CR PRE=14.40%, DR PRE=13.29%, TBS=2.27 deg. and "Peak Averaged Summation" vector magnitude=0.952. These examples show that with and without anticipated errors applied to SBI and LBI delta phase measurements for a frequency agile emitter, the "Peak Averaged Summation" vector magnitude stays above the 0.92 CTI threshold, indicating the RW track has only one emitter in its track.

Figure 6:
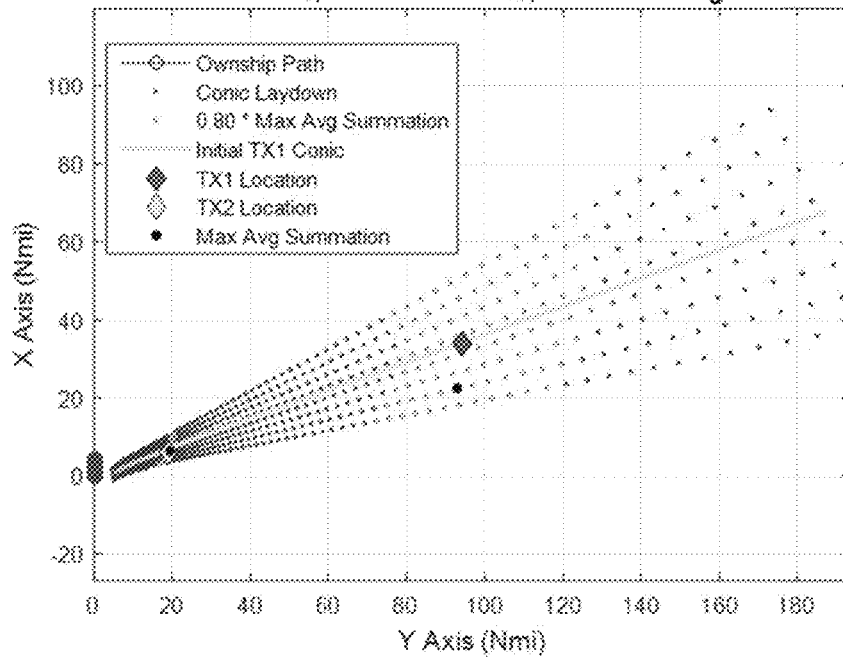
FIG. 6 depicts an example of two emitters each transmitting the same frequency configured in accordance with an embodiment.
Figure 6:
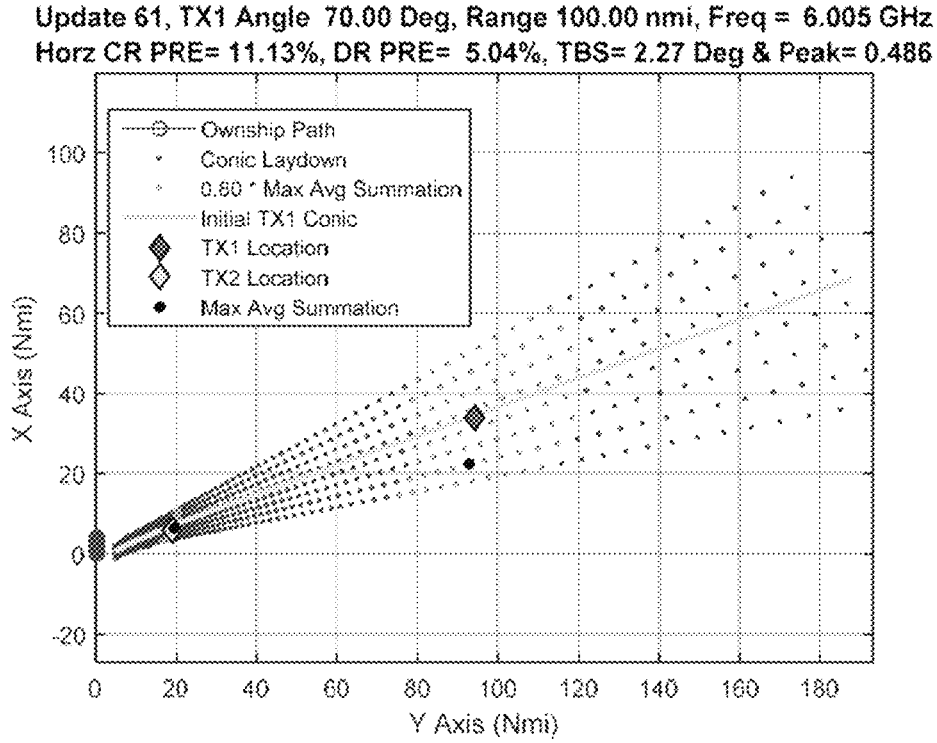

FIG. 6 depicts an example 600 of two emitters each transmitting the same frequency. "Peak Averaged Summation" vector magnitude is half the value compared to the test when only one emitter is present. Frequency tested=6.005 GHz. (Plot A) No error terms applied to SBI or LBI delta phase measurements. At LBI delta phase update number 61, TX1 angle 70.00 deg., range 100.00 Nmi., freq.=6.005 GHz, horiz. CR PRE=11.13%, DR PRE=5.04%, TBS=2.27 deg. and "Peak Averaged Summation" vector magnitude=0.509. (Plot B) Applying error terms to each SBI or LBI delta phase measurement. At LBI delta phase update number 61, TX1 angle 70.00 deg., range 100.00 Nmi., freq.=6.005 GHz, horiz. CR PRE=11.13%, DR PRE=5.04%, TBS=2.27 deg. and "Peak Averaged Summation" vector magnitude=0.486. These examples show that with and without anticipated errors applied to SBI and LBI delta phase measurements, the "Peak Averaged Summation" vector magnitude stays below the 0.92 CTI threshold. This becomes a strong indicator that a RW track contains multiple emitters.

Figure 7:
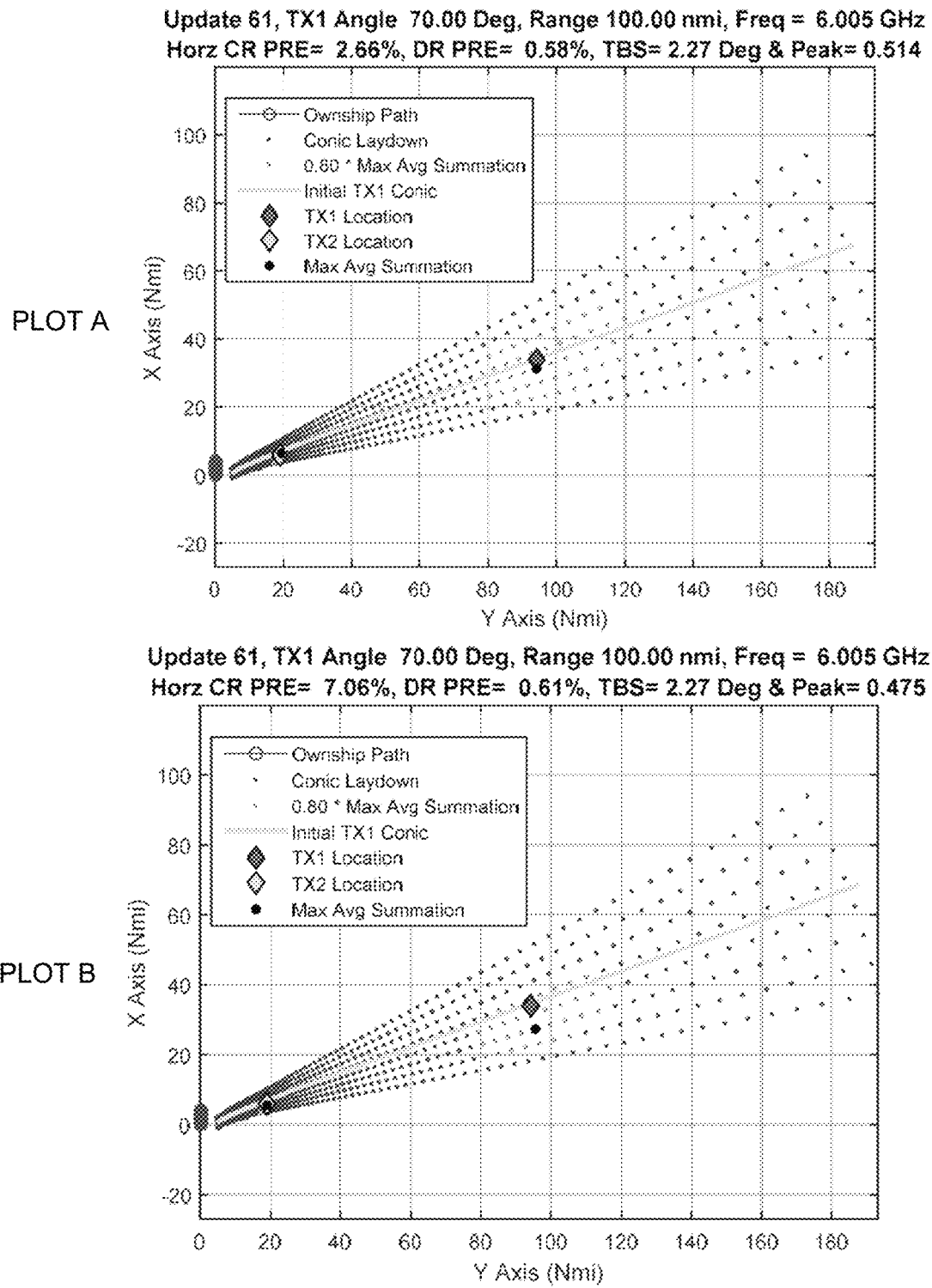
FIG. 7 depicts example of two emitters transmitting the same two frequencies configured in accordance with an embodiment.

FIG. 7 depicts an example 700 of two emitters each transmitting the same two frequencies. "Peak Averaged Summation" vector magnitude is half the value compared to the test when only one emitter is present. Frequencies tested=6.005 & 6.305 GHz (only 6.005 GHz shown). (Plot A) No error terms applied to SBI or LBI delta phase measurements. At LBI delta phase update number 61, TX1 angle 70.00 deg., range 100.00 Nmi., freqs.=6.005 & 6.305 GHz, horiz. CR PRE=2.66%, DR PRE=0.58%, TBS=2.27 deg. and "Peak Averaged Summation" vector magnitude=0.514. (Plot B) Applying error terms to each SBI or LBI delta phase measurement. At LBI delta phase update number 61, TX1 angle 70.00 deg., range 100.00 Nmi., freqs.=6.005 & 6.305 GHz, horiz. CR PRE=7.06%, DR PRE=0.61%, TBS=2.27 deg. and "Peak Averaged Summation" vector magnitude=0.475. These examples show that with and without anticipated errors applied to SBI and LBI delta phase measurements, the "Peak Averaged Summation" vector magnitude stays below the 0.92 CTI threshold. This becomes a strong indicator that a RW track contains multiple emitters.

Figure 8:
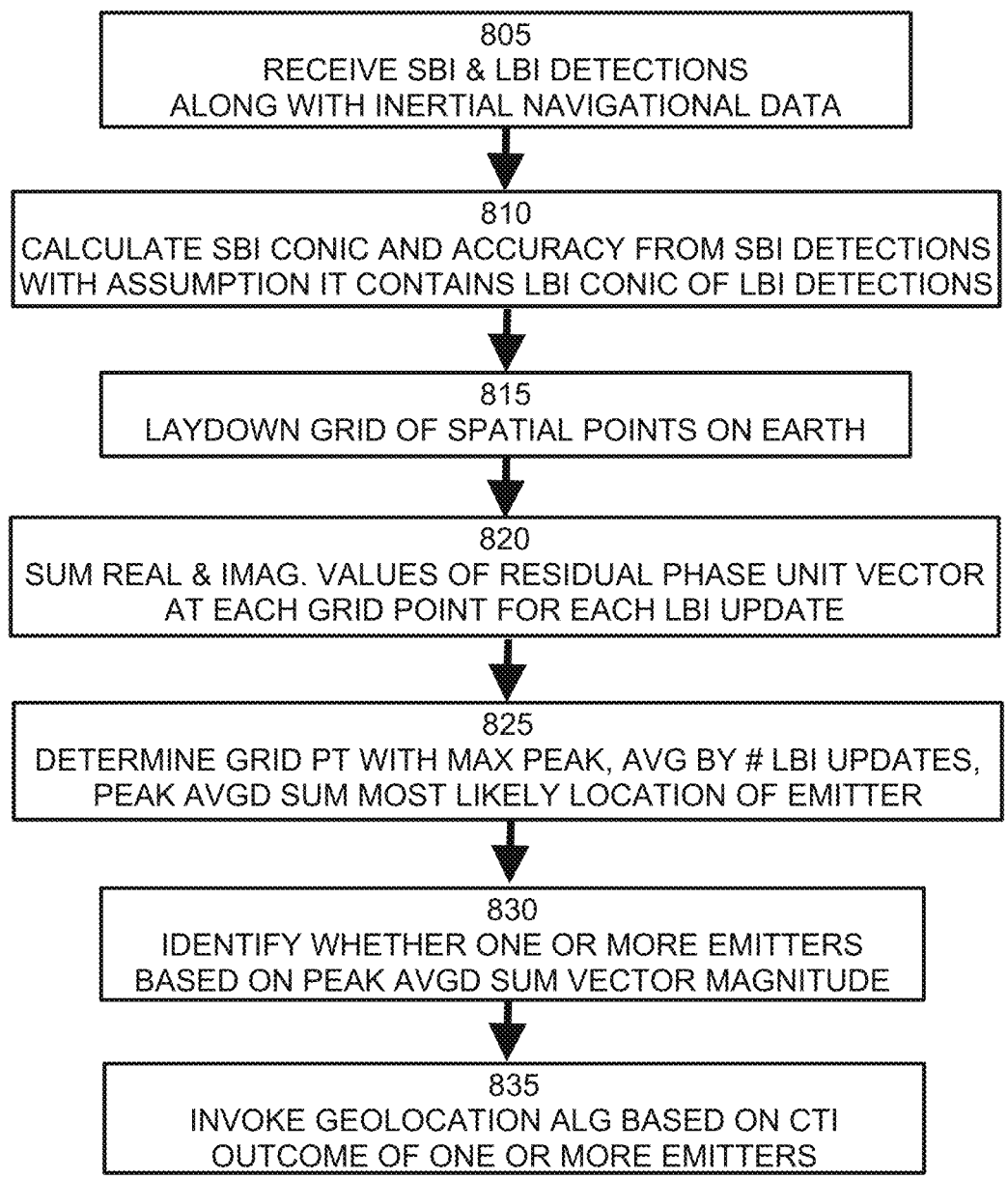
FIG. 8 is a method flowchart configured in accordance with an embodiment.

FIG. 8 is a method flowchart 800. The technique comprises the CTI algorithm which uses an initial set of SBI data, LBI data collected over time, and inertial navigational data provided over time to determine whether a Radar Warning (RW) track represents one emitter or a plurality of emitters over time.

The technique comprises receiving at a sensor array, an initial Short Base Interferometer (SBI) and Long Base Interferometer (LBI) set of detections; receiving at a processor, inertial navigational data used to determine location and orientation of aircraft over time.

The sensor array continues to receive subsequent LBI detections and the processor will continue to receive subsequent inertial navigational data 805 over time.

A processor determines from the initial SBI detections an unambiguous SBI conic 810 and its one sigma Direction Finding (DF) conic accuracy which should contain a highly accurate, yet ambiguous, LBI conic. The CTI algorithm lays out a set of grid points 815 on the Earth on a Local Level North-East-Down (LLNED) plane between the plus or minus multiple of 2.5 of the SBI conic's one sigma Azimuth Conic Direction Finding (DF) accuracy centered around the SBI DF conic bearing projected onto the Earth.

A processor sums the real and imaginary values of the residual phase unit vector at each grid point for each LBI update 820. Residual phase is computed by subtracting the theoretical delta phase that a pair of LBI antennas would produce if the emitter was located at that grid point, from the actual measured LBI delta phase. By maintaining a sum of the real and imaginary components of the residual unit vector phase at each grid point, the magnitude of the resultant vector for each running summation at each grid point can be used to determine whether one or more emitters are present.

Averaging the resultant vector for the grid point with the maximum peak summation vector magnitude by the number of LBI updates allows it to be normalized and suitable for evaluating no matter how many LBI updates have been added to the running summation at each grid point 825.

Determining the magnitude of the "Peak Average Summation' vector of the grid point with the maximum summation vector against a threshold value of (0.920) allows the CTI algorithm to determine whether RW track has one or more emitters contained within its track 830.

Based on the final "Peak Average Summation' vector magnitude produced by the CTI algorithm in step 825 against the CTI threshold value in step 830, a decision can be made as to how to invoke the geolocation algorithms in such a manner as to maintain as much geolocation accuracy and precision as possible 835.

Embodiments include outputting, from the method, a location of the at least one emitter to an output device.

The computing system used for the identification of emitters with same ID and similar angle-of-arrival for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system to identify at least one emitter for invoking a geolocation method for locating said at least one emitter comprising:
   receiving, at a sensor array, an initial Short Base Interferometer (SBI) and Long Base Interferometer (LBI) set of detections;
   receiving, at said sensor array, subsequent LBI detections;
   receiving inertial navigational data on platform's location and orientation;
   determining, in a processor, whether said subsequent LBI detections represent one emitter or a plurality of emitters over time by laying out a set of grid points and updating said grid points using said subsequent LBI detections; and
   invoking said geolocation method based on said determined emitter or plurality of emitters to locate said at least one emitter;
   wherein said initial SBI and LBI set of detections and said subsequent LBI detections have similar angles-of-arrival (AoA).

2. The system of claim 1 wherein said determining whether said subsequent LBI detections represent one emitter or a plurality of emitters comprises using a Direction Finding (DF) conic bearing and a plus or minus multiple of its one sigma DF accuracy of a Short Baseline Interferometer (SBI) array.

3. The system of claim 1 wherein said determining whether said subsequent LBI detections represent one emitter or a plurality of emitters comprises using a Direction Finding (DF) conic bearing and a plus or minus multiple of its one sigma DF accuracy of a Short Baseline Interferometer (SBI) array to laydown a grid on Earth with said grid points.

4. The system of claim 1 wherein said determining whether said subsequent LBI detections represent one emitter or a plurality of emitters comprises determining how Correlation and Track (CAT) Computer Software Configuration Item (CSCI) will invoke said geolocation method as a single frequency emitter versus a frequency agile emitter.

5. The system of claim 1 wherein said initial SBI and LBI set of detections and said subsequent LBI detections are correlated in a same Radar Warning (RW) track.

6. The system of claim 1 wherein said initial SBI and LBI set of detections and said subsequent LBI detections are in dense RF environments.

7. The system of claim 1 wherein a Short Baseline Interferometer (SBI) conic of said initial SBI and LBI set of detections is designated as a window defined by a plus or minus multiple of its one sigma Direction Finding (DF) accuracy, and containing a LBI conic from said subsequent LBI detections.

8. The system of claim 1 wherein a Short Baseline Interferometer (SBI) conic of said initial SBI and LBI set of detections is designated as being within a plus or minus multiple of 2.5 of its one sigma Azimuth Conic Direction Finding (DF) accuracy.

9. The system of claim 1 comprising laying said grid points on Earth of azimuth conics 15 to 165 degrees in 5 degree increments.

10. The system of claim 1 wherein said determining whether said subsequent LBI detections represent one emitter or a plurality of emitters comprises:
    an XY laydown in Local Level North-East-Down (LLNED) coordinates for a forward hemisphere of possible locations out to 200 nautical miles.

11. The system of claim 1 wherein said determining whether said subsequent LBI detections represent one emitter or a plurality of emitters comprises:
    summing a real and an imaginary value of a residual phase unit vector for each grid point at each of said subsequent LBI detections; and
    averaging by a number of said subsequent LBI detections; and
    determining a maximum averaged peak of a Peak Averaged Summation value pointing to a most likely location of said emitter.

12. The system of claim 1 wherein said sensor array is aboard an aircraft.

13. A method for identifying at least one emitter comprising:
    receiving an initial Short Base Interferometer (SBI) and Long Base Interferometer (LBI) set of detections;
    receiving subsequent LBI detections;
    determining whether said subsequent LBI detections represent said at least one emitter over time by summing a real and an imaginary value of a residual phase at a plurality of grid points for said subsequent LBI detections, averaging by a number of said subsequent LBI detections, and determining a maximum averaged peak of a Peak Averaged Summation vector magnitude; and invoking a geolocation method based on said Peak Averaged Summation to locate said at least one emitter.

14. The method of claim 13 further comprising using a Direction Finding (DF) conic bearing of said initial SBI set of detections to laydown a grid on Earth.

15. The method of claim 13 wherein said determining whether said subsequent LBI detections represent said at least one emitter comprises using a Correlation and Track (CAT) Computer Software Configuration Item (CSCI) to invoke geolocation algorithms as a single frequency emitter versus a frequency agile emitter.

16. The method of claim 13 wherein a Short Baseline Interferometer (SBI) conic is designated as containing a LBI conic within a plus or minus multiple of its one sigma Direction Finding (DF) accuracy.

17. A non-transitory computer readable medium having stored thereon software instructions that, when executed by a processor, cause said processor to generate control signals to identify at least one emitter for invoking a geolocation method for locating said at least one emitter by executing the following:

receiving, at a sensor array, an initial Short Base Interferometer (SBI) and Long Base Interferometer (LBI) set of detections;

receiving, at said sensor array, subsequent LBI detections;

receiving inertial navigational data on a platform's location and orientation;

determining, in a processor, whether said subsequent LBI detections represent said at least one emitter over time, said determining comprising:

designating a Short Baseline Interferometer (SBI) conic as containing a LBI conic based on said initial SBI and LBI set of detections with a plus or minus multiple of 2.5 of its one sigma Azimuth Conic Direction Finding (DF) accuracy;

using said SBI conic to laydown a set of grid points on Earth for a forward hemisphere of possible locations out to 200 nautical miles;

summing a real and an imaginary value of a residual phase in a form of a unit vector for said grid points at each of said subsequent LBI detections; and averaging by a number of said subsequent LBI updates;

determining a maximum averaged peak of a Peak Averaged Summation value and compare against a Cluster Track Identification (CTI) threshold;

identifying a track as most likely comprised of said at least one emitter; and invoking said geolocation method based on said at least one emitter determined in said track.

* * * * *